Patented Dec. 7, 1943

UNITED STATES PATENT OFFICE 2,336,261

ANTIFOGGING AND STABILIZING AGENT FOR PHOTOGRAPHIC EMULSIONS

Edward Bowes Knott, Wealdstone, England, assignor to Eastman Kodak Company, Rochester, N. Y., a corporation of New Jersey No Drawing. Application April 30, 1942, Serial No. 441,216. In Great Britain May 2, 1941

3 Claims. (Cl. 95—7)

This invention relates to photographic emulsions and more particularly to silver salt emulsions, especially gelatino silver halide emulsions, containing agents to stabilise the emulsion or to act as antifogging agents.

The invention is based on the principle that small quantities of oxydising agents can prove beneficial to the stability of an emulsion, provided that a good distribution of the agent in the emulsion is effected before oxydation takes place.

According to the present invention the tendency of a photographic emulsion to form fog is reduced, that is to say the stability of the emulsion is improved, by adding thereto a small amount of an oxydising agent in the form of a compound which liberates the said oxydising agent after incorporation in the emulsion. The compound containing the oxydising agent is preferably one which is more or less inert towards the emulsion when added, but releases the agent slowly so that the longer the photographic emulsion is kept and the higher the temperature at which it is stored, the more oxydising agent is liberated and hence under conditions which tend to produce fog in the emulsion the oxydising agent is produced as required to act as an antifoggant.

One class of oxydising agents which is particularly suitable for use in the invention is that which includes the halogen oxyacids such as hypochlorous acid, hypobromous acid and the like which may be added to the emulsion in the form of their relatively unstable compounds. Such compounds may be, for example, organic compounds, such as heterocyclic compounds, in which a halogen atom and a hydroxyl group are attached to neighbouring atoms wherein the halogen oxyacid is slowly liberated on keeping. If the oxyacids are combined with pyrimidine compounds advantage may be taken of the fact that in many cases the pyrimidine compound left after liberation of the oxydising agent also has a stabilising or antifoggant action on the emulsion.

The preferred compounds of pyrimidine and halogen oxyacid are those having the formula:

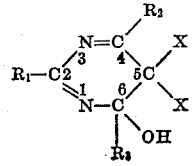

in which X represents halogen and $R_1$, $R_2$ and $R_3$ represent hydrogen or simple substituents. More particularly $R_1$ may be hydrogen, alkyl, aryl, aralkyl, amino, hydroxy, halogen, alkymercapto or the like, whilst $R_2$ and $R_3$ may be hydrogen, aryl, alkyl, aralkyl, halogen, hydroxy or amino.

In naming pyrimidine compounds for the purpose of this specification the numbering of the ring shown in the above formula will be followed.

The oxyhalgen-pyrimidines of the above type are relatively unstable and decompose slowly, liberating the hydroxy group from the 6 position together with one of the halogen atoms in the form of the oxyacid HOX.

The proportion of such oxyhalogen-pyrimidines which may be added to silver halide emulsions will vary with the amount of silver present in the emulsion and with the type of emulsion, but generally the amount will not be more than 0.2 gram for a quantity of emulsion containing the equivalent of 200 grams of silver nitrate, whilst the preferred amount is between 0.05 and 0.10 gram for such quantity of emulsion. The compounds are conveniently added in the form of a solution having a strength of about 1 in 5,000 parts of solvent. The solvent may be water, alcohol, acetone or other solvent not having a deleterious effect on the emulsion, but obviously the pyrimidine compound must dissolve therein without the application of heat which would otherwise cause premature decomposition.

The antifoggant may be added to the emulsion prior to the digestion stage or just prior to coating on a support. When added to the emulsion ready for coating it has been found that besides stabilising the emulsion there is also a noticeable reduction in initial fog without the loss of speed usually associated with the use of antifogging agents.

The oxyhalogen-pyrimidines of the present invention may be prepared by suspending in water a suitable pyrimidine, or a salt thereof, having hydrogen or a halogen atom in the 5 position and adding the required amount of halogen, viz. 4 atoms of halogen per molecule of pyrimidine for the compounds having hydrogen in the 5 position and 2 atoms of halogen per molecule for compounds having halogen in the 5 position. Thus, it is apparent that, by starting with a pyrimidine having a halogen in the 5 position, it is possible to treat this with a different halogen and so obtain two different halogens in the 5 position, for example, chlorine and bromine.

In the following table are given a number of examples of compounds which have been found to be suitable for use in the present invention. The first column in the table gives a reference number for each compound, whilst the second column gives the name of the pyrimidine from which the antifoggant compound is derived, and the third column gives the halogen used for the preparation of the dihalide.

*Table I*

| No. | Reacting pyrimidine | Halogen |
|---|---|---|
| 1 | 2:6 dioxypyrimidine (uracil) | Cl |
| 2 | ....do.... | Br |
| 3 | 2:6 dioxy-4-methylpyrimidine | Cl |
| 4 | ....do.... | Br |
| 5 | 2:6 dioxy-4-methyl-5-bromopyrimidine | Cl |
| 6 | 2-oxy-4-aminopyrimidine | Br |
| 7 | 2:6 dioxy-4-aminopyrimidine | Br |
| 8 | ....do.... | Cl |
| 9 | 2-amino-4:6-dioxypyrimidine | Br |
| 10 | 2-oxy-4:6-dimethyl pyrimidine | Br |
| 11 | ....do.... | Cl |
| 12 | 2-methyl-4:6-dioxypyrimidine | Br |
| 13 | 2-methyl-6-oxypyrimidine | Br |
| 14 | ....do.... | Cl |
| 15 | 2:4 dimethyl-6-oxypyrimidine | Br |
| 16 | 2-phenyl-6-oxypyrimidine | Br |
| 17 | 2-phenyl-4-methyl-6-oxypyrimidine | Br |
| 18 | 2-amino-6-oxypyrimidine | Br |
| 19 | 2:4-dioxy-6-phenyl pyrimidine | Br |
| 20 | 2-amino-4-methyl-6-oxypyrimidine | Br |
| 21 | 2-ethylmercapto-4:6-dichloropyrimidine | Br |
| 22 | 2:4:6-trichloropyrimidine | Br |

The preparation and behaviour of the following compounds has previously been given in the literature:

5:5-dibromoxyhydrouracil (where $R_1=O$, $R_2=H$, $R_3=OH$) see Wheeler and Johnson, J. Biol. Chem. III (1907) 187 and Johnson J. Am. C. S. Sept. (1940) 2269.

5:5 dibromoxymethylhydrouracil where $R_2$, $R_3=OH$, $R_2=CH_3$) see Behrend Ann. 229 (1885) 18.

It is important when making up the solution of the addition agent to choose a solvent which enables one to obtain about a 1:5,000 solution without having recourse to heat the solvent. Water alcohol or acetone are suitable solvents for all these compounds. By cold dissolution a neutral solution of the compound can be obtained.

Table II shows the effect of the addition before digestion to a high speed negative emulsion of some of the compounds of this type at a concentration between 0.05-0.10 gram per 200 gram equivalent silver nitrate. The emulsion was afterwards panchromatised and coated. Fog densities and speed figures are given, the latter being based on the exposure necessary to produce a density of 0.2 above fog. Data are also given for plates incubated at 55° C. for 7 days. The table shows the usefulness of the compounds. The first horizontal row gives the speeds and fog values of the untreated emulsion.

*Table II*

| Compound (see Table I) | Fog | | Speed | |
|---|---|---|---|---|
| | Initial | Incubated | Initial | Incubated |
| | .06 | .41 | 1,350 | 960 |
| 1 | .05 | .23 | 1,400 | 1,150 |
| 2 | .045 | .25 | 1,370 | 1,170 |
| 3 | .045 | .21 | 1,380 | 1,170 |
| 4 | .05 | .22 | 1,320 | 1,190 |
| 7 | .055 | .24 | 1,310 | 1,160 |

Table III shows the effect of compounds when added as a final addition at concentrations as shown in Table II to a panchromatised emulsion. It is seen that besides stabilising the emulsion there is also a noticeable reduction in initial fog without the loss of speed usually associated with the use of anti-fogging agent.

*Table III*

| Compound | Fog | | Speed | |
|---|---|---|---|---|
| | Initial | Incubated | Initial | Incubated |
| | .06 | .28 | 1,000 | 900 |
| 3 | .04 | .155 | 1,070 | 960 |
| 4 | .02 | .12 | 1,000 | 1,000 |
| 5 | .04 | .115 | 1,050 | 960 |
| 6 | .05 | .12 | 1,050 | 1,000 |
| 7 | .05 | .12 | 1,170 | 1,000 |
| 8 | .04 | .16 | 1,000 | 960 |
| 12 | .03 | .14 | 1,050 | 1,020 |
| 13 | .05 | .13 | 960 | 1,000 |
| 14 | .035 | .16 | 1,000 | 1,000 |
| 15 | .045 | .18 | 1,000 | 1,000 |

*Table IV*

Table IV shows the effect of the substances as addition agents on a non-optically sensitized emulsion which tended to give foggy coatings. The addition agents were added in concentrations varying between 0.05-0.10 gram per 200 gram equivalent of silver nitrate.

| Compound | Fog | | Speed | |
|---|---|---|---|---|
| | Initial | Incubated | Initial | Incubated |
| | .07 | .40 | 630 | 420 |
| 3 | .06 | .28 | 510 | 590 |
| 4 | .06 | .25 | 725 | 510 |
| 9 | .04 | .30 | 710 | 500 |
| 10 | .045 | .24 | 710 | 530 |
| 11 | .05 | .29 | 620 | 490 |
| 16 | .065 | .25 | 690 | 580 |
| 17 | .05 | .30 | 620 | 550 |
| 18 | .045 | .32 | 710 | 590 |
| 19 | .03 | .28 | 790 | 510 |
| 20 | .045 | .25 | 790 | 540 |
| 21 | .035 | .25 | 620 | 530 |
| 22 | .045 | .26 | 610 | 530 |

What I claim as my invention and desire to secure by Letters Patent of the United States is:

1. Method of improving the keeping properties and stability of photographic sensitive silver halide emulsions which comprises incorporating in the emulsion an oxyhalogen pyrimidine which releases a halogen oxyacid during storage of said emulsion.

2. Method of improving the keeping properties and stability of photographic sensitive silver halide emulsions which comprises incorporating in the emulsion not more than 0.1% based on the weight of silver nitrate, of a compound having the general formula:

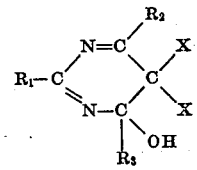

where X represents halogen, $R_1$ represents a group selected from the class consisting of hydrogen, alkyl, aryl, aralkyl, amino, hydroxy, halogen and alkylmercapto, $R_2$ and $R_3$ represent a group selected from the class consisting of hydrogen, alkyl, aryl, aralkyl, halogen, hydroxy and amino.

3. Method according to claim 2 in which the said compound is added to the emulsion just prior to the step of coating it on a support.

EDWARD BOWES KNOTT.